United States Patent [19]

Sheth

[11] Patent Number: 4,929,303
[45] Date of Patent: May 29, 1990

[54] COMPOSITE BREATHABLE HOUSEWRAP FILMS

[75] Inventor: Paresh J. Sheth, Sugarland, Tex.

[73] Assignee: Exxon Chemical Patents Inc., Linden, N.J.

[21] Appl. No.: 101,118

[22] Filed: Sep. 25, 1987

Related U.S. Application Data

[63] Continuation-in-part of Ser. No. 24,503, Mar. 11, 1987.

[51] Int. Cl.$^5$ .............................................. B31F 1/20
[52] U.S. Cl. .................................... 156/209; 156/219; 156/244.11; 156/244.24; 156/309.6; 156/309.9; 264/171; 264/284; 264/DIG. 62
[58] Field of Search ............... 428/212, 213, 287, 483; 156/209, 219, 244.11, 244.24, 309.6, 309.9; 264/171, 284, DIG. 62

[56] References Cited

U.S. PATENT DOCUMENTS

| | | | |
|---|---|---|---|
| 4,303,712 | 12/1981 | Woodroof | 428/58 |
| 4,344,999 | 8/1982 | Gohlke | 428/212 |
| 4,353,945 | 10/1982 | Sampson | 428/90 |
| 4,585,604 | 4/1986 | Okuyama et al. | 264/41 |
| 4,713,068 | 12/1987 | Wang et al. | 604/366 |
| 4,713,069 | 12/1987 | Wang et al. | 604/378 |
| 4,721,592 | 1/1988 | Freuehauf et al. | 156/209 |
| 4,725,481 | 2/1988 | Ostapchenko | 428/213 |
| 4,740,258 | 4/1988 | Geitscheidel | 156/209 |
| 4,758,297 | 7/1988 | Calligavich | 156/309.6 |

FOREIGN PATENT DOCUMENTS 1079620  4/1986  Japan .

*Primary Examiner*—Patrick Ryan
*Attorney, Agent, or Firm*—M. E. Wilson

[57] ABSTRACT

Composite breathable film comprising a breathable polyolefin film heat laminated to a nonwoven HDPE fabric. Preferably, the breathable film is prepared by melt embossing a highly filled polyolefin film to impose a pattern of different film thickness therein, and stretching the embossed film. The nonwoven fabric is made by cross-laminating HDPE fibers at the crossing points to form a thin open mesh fabric, and coextruding a heat seal layer thereon. The composite is made by heat laminating the breathable film to the heat seal layer of the fabric. The resulting laminate has excellent water vapor transmissibility, air resistance and strength and is particularly adapted for use as a housewrap.

17 Claims, No Drawings

COMPOSITE BREATHABLE HOUSEWRAP FILMS

CROSS-REFERENCE TO RELATED APPLICATION

This is a continuation-in-part of U.S. Ser. No. 024,503, filed Mar. 11, 1987, copending herewith.

BACKGROUND

1. Field of the Invention

The invention relates to breathable composites and, more particularly, breathable housewrap composites made of a breathable filled polyolefin film laminated to an open-mesh fabric and particularly to such composites having improved tensile, tear strength and stiffness characteristics.

2. Related Art

It is known to use porous polyolefin films in housewrapping applications. Housewrap films are attached or secured outside of the sheathing in the walls of homes, especially in cold climates. Housewrap materials must be permeable to water vapor to allow water vapor to escape from the wall to which the film is secured. Otherwise, water trapped in the wall may cause a condition known as "sweating" or rotting which may ultimately damage the wall. On the other hand, the film must be sufficiently impermeable to air to insulate the wall against wind and water. Further, the film must have adequate tensile and physical properties such as break strength, elongation, tear strength, shrinkage and puncture strength to avoid damage during installation and to facilitate durability.

One commercially available film heretofore used as a housewrap is made of high density polyethylene flash spun into fibers and pressed to form the film. The resulting flash-spun HDPE film has excellent breathability, but suffers from both a high air permeability and a relatively low tear strength. Thus, such housewrap is subject to damage during shipment and installation. Another commercially available film employed as a housewrap is melt blown, spun-bonded polyethylene. Like the flash-spun HDPE fiber film, the spun-bonded polyethlyene has excellent breathability, but likewise has a high permeability to air and even worse tensile properties, i.e. break strength, tear strength and puncture resistance. Thus, there is an unfilled need for a housewrap film with both breathability and good physical and tensile properties.

It is known to prepare porous polyolefin films by stretching a precursor film filled with calcium carbonate. "Breathable" films which are gas/vapor permeable and liquid impermeable have been described in U.S. Pat. No. 4,472,328, assigned to Mitsubishi Chemical Industries, Ltd. The Mitsubishi patent describes a breathable polyolefin film prepared from a polyolefin/filler composition having from 20 percent to 80 percent by weight of a filler such as a surface treated calcium carbonate. A liquid or waxy hydrocarbon polymer elastomer such as a hydroxy-terminated liquid polybutadiene was found to produce a precursor film that could be monoaxially or biaxially stretched to make a film breathable. The breathable film described by Mitsubishi is also described in Great Britain Patent No. 2,115,702, assigned to Kao Corporation. The Kao patent further describes a disposable diaper prepared with a breathable film as disclosed by the Mitsubishi patent. The breathable film is used as a backing for the diaper to contain liquid.

U.S. Pat. No. 4,350,655, assigned to Biax Fiber Film, describes a porous polyolefin film containing at least 50 percent by weight of a coated inorganic filler. The precursor film is formed without the addition of an elastomer by employing an inorganic filler surface coated with a fatty acid ester of only silicon or titanium. The precursor film is then rolled between horizontally grooved rollers. Cold stretching of the precursor film at a temperature below 70° C. produces a porous film. Some of the resulting films were stated to be both vapor and liquid permeable, however, and at least one film (Example 3) was stated to be permeable to air.

Nonwoven cross-laminated fibrillated film fabrics of high density polyethylene are also known such as, for example, as described in U.S. Pat. No. 4,681,781 assigned to C-I-L, Inc., and are commercially available, for example, under the trade designation CLAF from Conwed Plastics. The CLAF films, for example, are spread during the manufacturing process therefor and then laminated at the crossing points to form a thin, open mesh fabric of exceptional strength and durability. The CLAF films are known to be laminated to materials such as paper, film, foil, foam and other materials by lamination and extrusion coating techniques, or by sewing or heat sealing, adding significantly to the strength of the reinforced material without adding substantial bulk, according to the manufacturers. Reportedly successful uses of CLAF fabrics include shipping sacks for cement, fertilizer and resins, shopping, beach and tote bags, consumer and industrial packaging such as envelopes, form, fill and seal pouches, and tape backing, disposable clothing and sheeting, construction film and wraps, insulation backing, and reinforcement for reflective sheeting, tarpaulins, tent floors and geotextiles, and agricultural ground covers, insulation and shade cloth.

SUMMARY OF THE INVENTION

The present invention relates to breathable composites and, more particularly, relates to breathable housewrap composites with good breathability and improved strength and other properties. The breathable composite comprises a breathable polyolefin film laminated to an open mesh fabric. It has been found that such a laminate is particularly suitable as a housewrap because it has a water vapor permeability comparable to that of the breathable film, and yet has a low permeability to air and high break strength, tear strength and puncture strength.

DETAILED DESCRIPTION OF PREFERRED EMBODIMENTS OF THE INVENTION

Broadly, the invention is a laminate of a breathable polyolefin film and a fabric. Suitable breathable polyolefin films used in the laminate of the present invention should have a water vapor transmission rate as determined in accordance with ASTM F372-73, of at least about 3000 g/m² per day, preferably at least about 6000 g/m² per day, and especially at least about 8000 g/cm² per day, and resistance to air permeability not less than about 200 Gurley seconds, and preferably not less than about 500 Gurley seconds.

A preferred breathable film used in the laminate of the present invention is produced from a precursor film that is prepared from a polymer composition that comprises at least a polyolefin component and a filler. The polyolefin component may be any polyolefin which is suitable for film production, such as polypropylene, copolymers of propylene, homopolymers and copolymers of ethylene or blends thereof. A preferred polyolefin is a copolymer of ethylene and other α-olefins having from about 3 to about 18 carbon atoms, and particularly preferred is linear low density polyethylene.

Linear low density polyethylene (LLDPE) is produced by copolymerizing ethylene with a $C_4$ to $C_{10}$ alpha-olefin. Generally the preferred alpha-olefins include those selected from the group comprising butene-1, pentene-1, hexene-1, 4-methylpentene-1, heptene-1, and octene. The comonomers are present in amounts up to 20 wt. %, normally between 3 and 14 wt. The polymerization is conducted at low pressure using a chromium catalyst or Ziegler catalyst and may be carried out in the gas phase. The LLDPE produced by such methods have a density between 0.900 and 0.935 $g/cm^3$ and a melt index (MI) between 0.1 and 5.0 grams per 10 minutes. Manufacturing processes for production of LLDPE are known, such as disclosed in U.S. Pat. Nos. 4,076,698 and 4,205,021. LLDPE is preferred as the polyolefin film component for use in the laminate of this invention because of its high tear strength, ease of compounding, and low cost. However, it is contemplated that ultra low density polyethylene or plastomers are also suitable for use as the film component.

Fillers useful in the breathable film of the laminate of this invention may be any inorganic or organic material having a low affinity for and a significantly lower elasticity than the polyolefin component. Preferably the filler should be a rigid material having a non-smooth hydrophobic surface, or a material which is treated to render its surface hydrophobic. The preferred mean average particle size of the filler is between about 3 to 5 microns for films having a thickness of between 4-6 mil prior to stretching. Examples of the inorganic fillers include calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, glass powder, zeolite, silica, clay, etc. Calcium carbonate is particularly preferred for low cost, whiteness, inertness, and availability. The inorganic fillers such as calcium carbonate are preferably surface treated to be hydrophobic so that the filler can repel water to reduce agglomeration of the filler. Also, the surface coating should facilitate dispersion of the filler in the polymer while allowing the filler to be pulled away from the polyolefin under stress. A preferred coating is calcium stearate which is FDA approved and readily available. Organic fillers such as wood powder, pulp powder, and other cellulose type powders may be used. Polymer powders such as Teflon ® powder and Kevlar ® powder can also be used.

The amount of filler added to the polyolefin depends on the desired properties of the breathable film including tear strength, water vapor transmission rate, and stretchability. However, it is believed that a breathable film cannot be produced as is taught herein with an amount of filler less than about 15 percent by volume of the polyolefin/filler composition (e.g. LLDPE/$CaCO_3$ having less than about 38 percent by weight $CaCO_3$). The minimum amount of filler is needed to insure the interconnection within the film of voids created at the situs of the filler, particularly by the stretching operation to be subsequently performed on the precursor film. Further, it is believed that useful films could not be made with an amount of the filler in excess of about 35 percent by volume of the polyolefin/filler composition (e.g. LLDPE/$CaCO_3$ having greater than about 65 percent by weight $CaCO_3$). Higher amounts of filler may cause difficulty in compounding and significant losses in strength of the final breathable film.

Polyolefin/filler compositions usable in the breathable film of the laminate of this invention may be compounded in several different ways. The components may be brought into intimate contact by, for example, dry blending these materials and then passing the overall composition through a compounding extruder. Alternatively, the polyolefin and filler components may be fed directly to a mixing device such as a compounding extruder, high shear continuous mixer, two roll mill or an internal mixer such as a Banbury mixer. Overall, the objective is to obtain a uniform dispersion of the filler in the polymer without agglomeration, and this is readily achieved by inducing sufficient shear and heat to cause the polyolefin component to melt. However, time and temperature of mixing should be controlled as is normally done to avoid molecular weight degradation. Compounding of LLDPE and calcium carbonate that is surface treated with calcium stearate has been improved by vacuum drying the mixture within the extruder.

The tear strength and softness of a film prepared from the polyolefin/filler composition may be improved by addition of small amounts of an olefinic elastomer.

The film forming composition may be manufactured into a precursor film by conventional tubular extrusion (blown bubble process), by cast extrusion or by quenching techniques which are well known in the art. Film formation by cast extrusion is preferred because the cast film can be immediately melt embossed as described below.

In the cast extrusion process, the molten resin is extruded from an elongate die in the form of a web. The web is pressed against a cold roll to chill and solidify the film. An embossed pattern may be imparted on the film utilizing an engraved roll. The precursor film is preferably produced to a gauge of 4 to 6 mils, which allows for further stretching as described below. The extrusion temperatures, die temperatures, and embossing roll temperatures will depend on the composition employed, but generally will be in the following ranges for compositions of the present invention prepared by cast extrusion:

| | |
|---|---|
| Melt Temperature (°F.) | 350–450 |
| Die Temperature (°F.) | 350–450 |
| Embossing Roll Temperature (°F.) | 70–130 |

Film formation by tubular extrusion produces balanced films having increased film strength in both the machine and cross-machine direction. In the tubular blown film process, the film forming composition is first melted and then extruded through an annular die. The die should preferably have a die gap suitable for extruding LLDPE resin which normally is greater than about 0.5 mm and preferably greater than 0.75 mm. The film forming composition is extruded at a melt temperature between about 150° C. to 300° C., preferably between 190° C. and 240° C. The molten composition is preferably extruded in an upward vertical direction in the form of either a bubble or a tube, although it also can be extruded either downwardly or horizontally. The tubular extrudate is expanded to the desired dimensions and then cooled by one of several conventional techniques which are well known in the art, e.g., forced air, mandrel, and water quench. The tubular film, or bubble, is then flattened by passing the film through a collapsing frame and a set of nip rolls. The nip rolls are driven, thereby proving a means of drawing the tubular film or bubble away from the annular die.

A positive pressure of a gas, such as air or nitrogen, is maintained inside the tubular bubble. As is known in the operation of conventional blown film processes, the presence of the gas is controlled to impart a desired dimensional orientation to the film tube or bubble. The degree of tubular bubble expansion may be measured as the ratio of the expanded bubble circumference to the circumference of the die annulus. This ratio is generally in the range of 1:1 to 6:1 and for a precursor breathable film is preferably from 2:1 to 4:1.

Embossing is typically used on the surface of polyolefin films to reduce gloss. Embossing can be imposed on the precursor film surface at the time of the film fabrication for cast extrusion, or at a subsequent time for cast or tubular extrusion by procedures well known in the art. For the present breathable film used in the laminate of the invention, embossing imposes a pattern of different film thicknesses within the precursor film, and can be conducted with any micro/macro pattern, e.g. cross-hatching, dots, lines, circles, diamonds, hexagons etc. The pattern can be either in line and/or off line and the rolls can be engraved with either pin up and/or pin down type configurations.

Final preparation of a breathable film for use in the present laminate is achieved by stretching the precursor film to form interconnected voids. Stretching or "Orientation" of the film may be carried out monoaxially in the machine direction (MD) or the transverse direction (TD) or in both directions (biaxially) either simultaneously or sequentially using conventional equipment and processes following cooling of the precursor film.

Blown films are preferably stretched in the machine direction or in both directions whereas cast films are preferably stretched in the transverse direction. For orientation in the MD, the precursor film is passed around two rollers driven at different surface speeds and finally to a take up roller. The second driven roller which is closest to the take up roll is driven faster than the first driven roller. As a consequence the film is stretched between the driven rollers.

Film orientation may also be carried out in a tentering device with or without MD orientation to impart TD orientation to the film. The film is gripped by the edges for processing through the tentering device. Stretching of melt embossed precursor films with a tentering device at a film speed of about 60 meters per minute produced breathable films having the desired water vapor and permeabilities. The resulting films had greater permeability in the areas of reduced thickness in comparison to the areas of greater thickness.

Although not thoroughly investigated, controlling of the strain on the film during stretching is believed to be important to controlling the permeability. For stretching in the transverse direction, strain is controlled for a given stretch ratio by adjusting the film speed and the stretching distance. The stretching distance is measured, between the point where the film starts to increase in width to the closest point where the film is fully stretched. For stretching in the machine direction, strain is controlled for a given stretch ratio by controlling film speed and the gap between the first and second driven rollers.

A range of stretching ratios from 1:2 to 1:5 prove satisfactory for MD stretching with a ratio of 1:4 being preferred. A range of stretching ratios of 1:2 to 1:5 prove satisfactory for TD stretching with a ratio of 1:4 being preferred.

The water vapor permeability of the embossed film following stretching, as measured by the final WVTR of the film, was found to be inversely related to the stretching temperature. Stretching at a temperature of about 45° C. produced a film having a slightly higher WVTR than stretching at temperatures of about 60° C.

The stretched film can be heat set to stabilize the film for any subsequent processing at temperatures above the stretching temperature. The film can be heat set at any temperature above the stretching temperature and below the softening temperature to add stability. However, higher temperatures cause stiffness and some reduction in WVTR. Heat setting at about 80° C. produced a softer film with substantially higher WVTR in comparison to heat setting at about 95° C.

It is preferred that tension be maintained on the film during the heat setting and cooling to minimize shrinkback. Upon cooling to ambient temperature (i.e., room temperature) or near ambient, the holding force may be released. The film may contract somewhat (snapback) in the TD but will retain a substantial portion of its stretched dimension.

Heat setting can be accomplished by maintaining the film under tension in the stretched condition at the heat setting temperature for about 1-2 minutes. Preferably, however, the heat setting and cooling is carried out while permitting the film to contract slightly, but still under stress. The controlled shrinkback of from 5 to 30%, preferably between 15 and 25%, of the maximum stretched width has given particularly good results in eliminating storage shrinkage.

Fabrics suitably laminated to the breathable film in the housewrap of the present invention include any high strength fabric which can be bonded to the breathable film without adversely affecting the water vapor permeability or the resistance to air permeability of the breathable film, i.e. the fabric must generally have a suitably open mesh to avoid substantially blocking the micropores of the breathable film. The fabric may be woven of any suitable material, but is preferably nonwoven polyolefin such as, for example, low density polyethylene, polypropylene, and preferably linear, low density polyethylene or high density polyethylene. The fabric should have an elongation (ASTM D1682) less than about 30%; an Elmendorf tear strength (ASTM D689) of at least about 300 g, preferably at least about 600 g and especially at least about 900 g; and a break-load (ASTM D1682) of at least about 15 lb/in., preferably at least about 25 lb/in., and especially at least about 30 lb/in. These fabrics are believed to be prepared from HDPE films having outer layers of ethylene-vinyl acetate coextruded on either side of the HDPE or heat seal layers. The films are fibrillated, and the resulting fibers are spread in at least two transverse directions at a strand count of about 6-10 per inch. The spread fibers are then cross-laminated by heat to produce a nonwoven fabric of 3-5 mils with about equal MD and TD strength. These fabrics have excellent strength properties in both MD and TD for reinforcing the breathable film, an open structure to avoid substantially blocking the micropores of the breathable film when laminated thereto, and an outer layer of ethylene-vinyl acetate copolymer for heat sealability.

The fabric and the breathable film are laminated together to form the breathable composite of the invention. The lamination may be effected by facing the film and the fabric together and applying heat and pressure. The laminating temperatures to which the film and fabric are exposed should be sufficient to achieve lamination, but should not be too high in order to avoid the flow of the film polymer into the microporous spaces and a consequent reduction in water vapor transmissibility. In a preferred embodiment, the fabric is heated on a hot roller, preferably at 200°-240° F., and then pressed, preferably at a pressure of about 50-100 psi, into contact with the unheated film to bond the fabric and film into the laminate.

Preferred fabrics are commercially available under the trade designations CC-1001, CC-2001 and CC-3001 CLAF nonwoven HDPE fabrics.

EXAMPLES

The following examples, which illustrate melt embossed breathable films and fabric laminates thereof prepared in accordance with the present invention, are not intended to limit the invention to the specific compositions. Other compounds such as elastomers, stabilizers against heat or ultraviolet rays, pigments, antistatic agents, etc. may be added to the compositions in the conventional manner. In the examples which follow water vapor transmission rates (WVTR) were measured in accordance with ASTM F372-73 using a Permatran W1 analyzer manufactured by Modern Controls International, Inc. and air resistance was measured on a Gurley H-P-S Tester No. 4200 in accordance with the manufacturer's directions.

EXAMPLE 1 (COMPARISON)

A linear low density polyethylene which consisted of a copolymer of ethylene and hexene-1 was compounded with an equal weight of a surface treated calcium carbonate. The calcium carbonate was surface treated with calcium stearate to render the surface of the particles hydrophobic. The resulting formulation was cast extruded into a precursor film having a thickness of approximately 4 to 6 mil.

The resulting precursor film was cooled and then subjected to tentering stress in the transverse direction with a stretch ratio of 4 to 1 and a film speed of about 60 meters per minute. Stretching was performed in a tentering frame with heat applied only to the final zone of the tentering frame. The temperature of the film in the final zone was maintained at about 93° C. As a result of convection within the tentering frame, stretching of the film occurred at approximately 60° C. The film became white and breathable when stretched and retained those properties following the heat setting treatment. The final breathable film had a water vapor transmission rate of up to 5800 grams per square meter per day at 38° C.

EXAMPLE 2

The LLDPE/calcium carbonate composition of Example 1 was cast extruded under the same conditions as Example 1. The precursor film was passed between a smooth roller and a diamond patterned embossing roller. The resulting film had a thickness of approximately 4 to 6 mil and a diamond pattern on one side. The film became whiter when stretched at the temperature and conditions stated for Example 1. Heat setting was also conducted as described for Example 1. This film had a WTVR value of 8,100 grams per square meter per day. Stretching caused greater permeability in the thin portions of the film created by the embossing roll in comparison to the thick area which retained greater strangth. The final film had a drapy and softer film structure and a higher tear strength than the film of Example 1.

EXAMPLE 3

The LLDPE/filler composition of Example 1 was extruded and melt embossed under the same conditions cf Example 2. The precursor film was then stretched with the tentering device of Example 2. The temperature of the film in the heat setting zone was maintained at about 78° C. and stretching occurred at about 35° C. The final film had a WTVR value of 10,300 grams per square meter per day.

EXAMPLE 4

A breathable film was prepared under the same conditions of Example 3 except that the stretching temperature was adjusted to 70° C. The final film had a WVTR value of 10,000 grams per square meter per day.

EXAMPLE 5

A breathable film was prepared under the same conditions of Example 3 except that the stretching temperature was adjusted to 93° C. The final film had a WVTR value of 9,900 grams per square meter per day.

The following Table 1 presents a comparison of the variables in Examples 1–5.

TABLE 1

|  | Stretch Temp.,°C. | Heat Set Temp.,°C. | WVTR g/m²/day |
|---|---|---|---|
| Example 1 (Comparison) | 60 | 93 | 5.800 |
| Example 2 | 60 | 93 | 8.100 |
| Example 3 | 35 | 78 | 10.300 |
| Example 4 | 70 | 78 | 10.000 |
| Example 5 | 93 | 78 | 9.900 |

EXAMPLE 6-19

Various breathable films ("BF") prepared in the manner described above under the conditions indicated in Table II (50wt. % LDPE/50 wt. % CaCO₃)were heat laminated with commercially available CLAF nonwoven fabrics designated CLAF-1001, CLAF-2001, CLAF-3001 and CLAF-5001 having the properties indicated in Table II. The CLAF fabrics had a heat seal layer comprising ethylene-vinyl acetate copolymer. The breathable films and fabrics were heat laminated by heating the fabric to 200°-240° F. and pressing the unheated BF to the heated fabric between rollers at 100 psi. Two commercially available housewraps, with the trade designations BARRICADE ® (spun-bonded polyethylene) and TYVEK ® (flash spun HDPE) are included in Table II as Examples 18 and 19 for purposes of comparison.

TABLE II

| Example | Film/Fabric/Composite | Stretch Temp. (°F.) | Heat Set Temp. (°F.) | Laminating Temp. (°F.) | Weight (oz/yd²) | WVTR (g/m²/day) @ 37.8° C.) | Gurley Air Resistance (sec/100 ml) | Breakload (lb/in) MD | Breakload (lb/in) TD | Elongation (%) MD | Elongation (%) TD | Elmendorf (g) MD | Elmendorf (g) TD |
|---|---|---|---|---|---|---|---|---|---|---|---|---|---|
| 6 | BF | 175 | 205 | — | 0.4 | 8000 | 500 | 2.5 | 7.0 | 400 | 100 | 1260 | 45 |
| 7 | CLAF-1001 | — | — | — | 1.4 | — | — | 32 | 34 | 25 | 30 | 939 | 963 |
| 8 | Ex. 6 + CLAF-1001 | 175 | 205 | 240 | 2.6 | 6000 | 800 | 38 | 37 | 27 | 30 | 1200 | 1400 |
| 9 | BF | 175 | 205 | — | 0.5 | 8000 | 500 | 2.5 | 7.0 | 400 | 100 | 1260 | 45 |
| 10 | CLAF-3001 | — | — | — | 0.7 | — | — | 15 | 15 | 18 | 21 | 427 | 351 |
| 11 | Ex. 9 + CLAF-3001 | — | — | 225 | 1.9 | 6400 | 600 | 20 | 27 | 16 | 24 | 1300 | 1200 |
| 12 | BF | — | — | — | 0.5 | 3600 | 3000 | 12 | 1.3 | 90 | 320 | 200 | 180 |
| 13 | CLAF-2001 | — | — | — | 0.9 | — | — | 19 | 24 | 22 | 29 | 624 | 605 |
| 14 | Ex. 12 + CLAF-2001 | — | — | — | 2.0 | 3250 | 3000 | 27 | 23 | 21 | 23 | 600 | 880 |
| 15 | CLAF-5001 | — | — | — | 0.4 | — | — | 10.5 | 10.5 | 19 | 19 | 139 | 158 |
| 16 | Ex. 9 + CLAF-5001 | — | 220 | 225 | 1.4 | 6400 | 550 | 18 | 15 | 19 | 15 | 850 | 220 |
| 17 | Ex. 9 + CLAF-3001 | — | 225 | 225 | 2.0 | 6500 | 800 | 28 | 30 | 24 | 28 | 1200 | 1175 |
| 18 | Barricade ® | — | — | — | 1.5 | 9200 | 20 | 9.0 | 3.0 | 22 | 26 | 230 | 260 |
| 19 | Tyvek ® | — | — | — | 2.0 | 10000 | 20 | 22 | 31 | 15 | 20 | 480 | 460 |

From the data seen in the foregoing Table II, it is readily apparent that the housewrap of the present invention is far superior to the commercially available housewrap, in both air resistance and tear strength, and comparable in water vapor transmissibility. Quite surprisingly, the breathable film/CLAF fabric laminates substantially retain the desirable water vapor transmissibility and air resistance of the breathable film, but yet generally have average tear, elongation and breakload properties better than either the breathable film or the CLAF fabric, a truly synergistic result.

While the invention has been described as a housewrap, the laminated fabric and film is equally well suited for other applications, including for example, the manufacture of disposable absorbent fabrics such as diapers and devices for incontinents medical and surgical supplies, apparel and household furnishings, tape and packaging, and filtration membranes. Specific examples may include burn dressings, sterile packaging, rain coats, shoe linings, nonfogging packaging film, bacteria filters, water purification filters and the like.

Having described the invention above, various changes from the specific materials, procedures and apparatus will occur to those skilled in the art. It is intended that all such variations within the scope and spirit of the appended claims will be embraced thereby.

What is claimed is:

1. A method of preparing a breathable laminate comprising a breathable polyolefin film having a water vapor transmission rate of at least about 3000 g/m² per day and an air resistance not less than about 200 Gurley seconds and a fabric having an elongation less than about 30%, an Elmendorf tear strength of at least about 300 g, and a breakload of at least about 15 lb/in wherein said method comprises the step of laminating said film to said fabric at a temperature and pressure sufficient to bond the fabric and film.

2. A method of preparing a laminate in accordance with claim 1 wherein said fabric further comprises a coextruded heat seal layer and said method comprises the step of heat laminating said film to said heat seal layer of said fabric.

3. The method of claim 2, wherein the fabric is heated and pressed to the film.

4. A method of making a housewrap, comprising the steps of:
mixing a polyolefin with a filler;
extruding a precursor film from the polyolefin/filler mixture;
melt embossing the precursor film to impose therein a pattern of different film thicknesses;
stretching the melt embossed precursor film to impart greater permeability in the areas of reduced thickness thereof in comparison to the areas of greater thickness; and
heat laminating the stretched film to a nonwoven fabric comprising cross-laminated fibers at a temperature and pressure sufficient to bond the fabric and film to form a breathable laminate.

5. The method of claim 4, further comprising the step of heat setting the stretched film at a temperature above the stretching temperature and below the softening temperature of the stretched film.

6. The method of claim 4, wherein the polyolefin is a copolymer of ethylene and a $C_4$–$C_{10}$ alpha-olefin.

7. The method of claim 5, wherein the filler is calcium carbonate surface treated with calcium stearate.

8. The method of claim 5, wherein the precursor film is melt embossed with a diamond pattern.

9. The method of claim 5, wherein the polyolefin/filler mixture contains between about 15 percent to about 35 percent filler by volume.

10. The method of claim 4, wherein the fabric is a nonwoven polyolefin fabric having a heat seal layer.

11. The method of claim 10, wherein the lamination comprises heating the fabric and pressing the unheated film to the heated fabric.

12. A method of making a housewrap, comprising the steps of:
mixing a polyolefin with a filler;
cast extruding a precursor film of the polyolefin/filler mixture onto at least one melt embossing roller to impose therein a pattern of different film thicknesses;
stretching the melt embossed precursor film in the transverse direction to impart greater permeability in the areas of reduced thickness thereof in comparison to the areas of greater thickness;
heating a nonwoven fabric comprising cross-laminated polyolefin fibers and an ethylene-vinyl acetate copolymer heat seal layer; and pressing the heated fabric to the film at a temperature and pressure sufficient to bond the fabric and film to form a breathable laminate.

13. The method of claim 12, further comprising the step of heat setting the stretched film at a temperature above the stretching temperature and below the softening temperature of the stretched film.

14. The method of claim 12, wherein the polyolefin is a copolymer of ethylene and a $C_4$–$C_{10}$ alpha-olefin.

15. The method of claim 12, wherein the filler is calcium carbonate surface treated with calcium stearate.

16. The method of claim 12, wherein the precursor film is melt embossed with a diamond pattern.

17. The method of claim 12, wherein the polyolefin/filler mixture contains between about 15 percent to about 35 percent filler by volume.

* * * * *